(No Model.)

A. H. BOWMAN.
TEA OR COFFEE POT OR SIMILAR VESSEL.

No. 413,748. Patented Oct. 29, 1889.

Witnesses
H. A. Lamb
Geo. M. Copenhaver

Inventor
Arthur Hart Bowman
By his Attorney

UNITED STATES PATENT OFFICE.

ARTHUR HART BOWMAN, OF LONDON, ENGLAND.

TEA OR COFFEE POT OR SIMILAR VESSEL.

SPECIFICATION forming part of Letters Patent No. 413,748, dated October 29, 1889.

Application filed February 12, 1889. Serial No. 299,685. (No model.) Patented in England October 28, 1885, No. 12,951, and November 10, 1886, No. 14,562; in New South Wales July 8, 1886, No. 1,875; in Belgium March 19, 1888, No. 81,902, and in France May 30, 1888, No. 190,908.

*To all whom it may concern:*

Be it known that I, ARTHUR HART BOWMAN, a subject of the Queen of the United Kingdom of Great Britain and Ireland, residing at London, England, have invented an Improvement in Tea or Coffee Pots or Similar Vessels, (patented in England, No. 12,951, October 28, 1885, and No. 14,562, November 10, 1886; in New South Wales, No. 1,875, July 8, 1886; in Belgium, No. 81,902, March 19, 1888; and in France, No. 190,908, May 30, 1888,) of which the following is a specification.

My present invention relates to those strainers for tea or coffee pots or similar vessels which are readily attachable and removable at will and of very extended surface, and are conveniently constructed of fine wire-gauze.

The invention consists in certain novel combinations of parts, whereby such strainers are readily manipulated without grasping, and thus indenting, the strainer proper, and are tightly attached, so as to prevent the escape of tea-dust or coffee-sediment around as well as through them.

Figure 1:
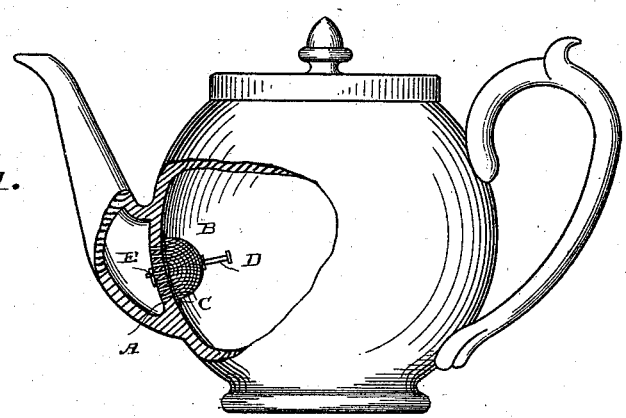
Figure 2:
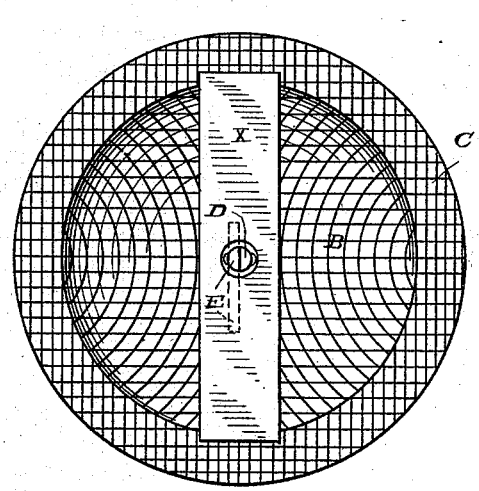
Figure 3:
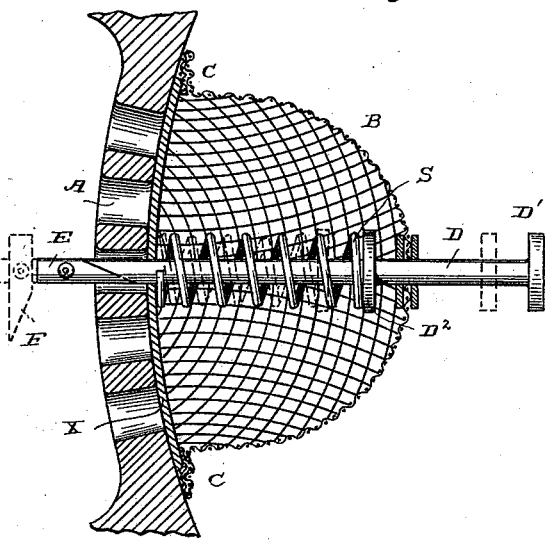
Figure 4:
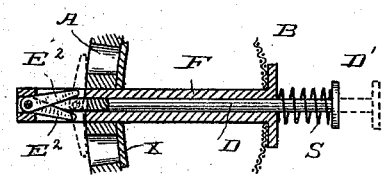
Figure 5:
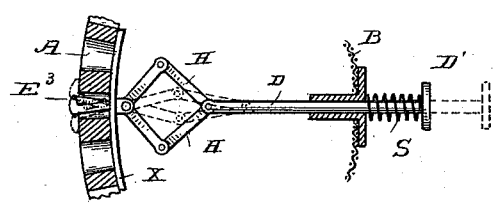

Figure 1 represents a sectional elevation of an earthenware or metallic tea-pot with extended strainer securely attached by a peculiar automatic attaching-finger. Fig. 2 is an enlarged face view of the said strainer and automatic attaching-finger. Fig. 3 is a sectional elevation of the same, illustrating the manner of attaching the strainer. Figs. 4 and 5 are fragmentary sectional elevations illustrating modifications.

Like letters of reference indicate corresponding parts in all the figures.

To any tea or coffee pot or similar vessel already provided with the usual perforated strainer A at the base of the spout I apply an extended dome-shaped strainer B, of fine wire-gauze, of sufficient diameter to cover the fixed perforated strainer A, and of large and extended area projecting within the pot. It is fitted with or worked out into a marginal flange C, resting upon the inner surface of the pot, and in either type of the strainer is pressed tightly against said surface by a spiral spring S, and is sufficiently flexible to conform itself thereto under such pressure as indicated in Figs. 1 and 3. There is also in each type of the present detachable strainer a central attaching rod or pin D, having at its outer end a knob D', fast thereon, by which the strainer is conveniently handled in attaching and removing it without grasping the wire-gauze.

In the specific device shown in Figs. 1, 2, and 3 the pin D is provided with a collar $D^2$, Fig. 3, within the dome-shaped strainer B, and the latter is provided with a cross-bar X, against which the spring S reacts; and an automatic attaching-finger E is pivoted to the pin D at its extremity opposite its knob D'. In a given horizontal position of the pin D one end of the finger E falls downward from the body of the pin, being heavier than the other end, and the finger thus locks across the aperture at the back of any perforation through which it may have been passed.

To attach the strainer B, the pin D is pressed forward, with the finger E lying close against the pin till it enters one of the center holes in the strainer A, as illustrated by Fig. 3. After the pin D has been pushed forward a sufficient distance (represented by dotted lines in Fig. 3) the finger E falls within the spout and prevents the pin from drawing back through the strainer A until intentionally released.

To release the pin D, it is pushed forward to the dotted-line position in Fig. 3, and when the pot is so held that the pin D and finger E are vertical the said finger falls back again into line with the pin D and may be readily withdrawn.

It is obvious that I may use several modified but equivalent forms of the locking attachment, affixing the strainer to the base of the spout—as, for instance, the pin D may be within a sleeve F, Fig. 4—and when the strainer B is in place the relative movement of the pin to the sleeve may be made to throw out a catch or catches $E^2$ behind the strainer A; or a pair of scissor-levers $E^3$, Fig. 5, may be pressed together or closed to cause them to enter a perforation, and then expanded by the elasticity of the spring S to grip behind the strainer A. The pin D may be connected with such scissor-lever E³ by links H, Fig. 5, and in both of the said modifications the spring S is conveniently arranged immediately behind the knob D', as shown in Figs. 4 and 5.

Having now particularly described my said invention, I declare that what I claim is—

1. An improved detachable strainer for a tea or coffee pot or similar vessel, comprising a strainer proper, of fine wire-gauze, of a dome shape, an attaching-pin projecting centrally through the apex of the dome and having a knob fast on its outer end and adapted to be grasped by the fingers for manipulating the strainer, and an attaching device at the opposite end of said pin, substantially as hereinbefore specified.

2. An improved detachable strainer comprising a flexible strainer proper, of fine wire-gauze, of a dome shape, an endwise-movable attaching-pin projecting centrally through the apex of the dome and having a knob fast on its outer end, an attaching device carried by the opposite end of said pin, and a spring reacting against abutments carried by the said pin and strainer proper, respectively, substantially as hereinbefore specified.

3. An improved detachable strainer comprising a strainer proper, of fine wire-gauze, of a dome shape, having a marginal rim, an attaching-pin projecting centrally through the apex of the dome, an attaching device carried by said pin and adapted to engage with the ordinary perforated strainer of a tea or coffee pot, and a spring reacting against abutments carried by the said pin and strainer proper, respectively, substantially as hereinbefore specified.

4. In combination with a strainer proper, of fine wire-gauze, of a dome shape, having a marginal rim and a cross-bar in the plane of the said rim, an attaching-pin extending through the apex of said strainer and having a fixed collar within the latter, a spring confined between said cross-bar and collar, and a gravitating finger pivoted to said pin and adapted to engage with the ordinary perforated strainer of a tea or coffee pot, substantially as hereinbefore specified.

In testimony whereof I have signed my name to this specification in the presence of two subscribing witnesses.

ARTHUR HART BOWMAN.

Witnesses:
RICHARD A. HOFFMANN,
ALBERT E. NASH.